US008405597B2

(12) United States Patent
Oh et al.

(10) Patent No.: US 8,405,597 B2
(45) **Date of Patent: *Mar. 26, 2013**

(54) LIQUID CRYSTAL DISPLAY PANEL AND DISPLAY APPARATUS HAVING THE SAME

(75) Inventors: Joon-Hak Oh, Seoul (KR); Chong-Chul Chai, Seoul (KR); Baek-Woon Lee, Yongin-si (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/209,888

(22) Filed: Aug. 15, 2011

(65) Prior Publication Data

US 2011/0298783 A1 Dec. 8, 2011

Related U.S. Application Data

(63) Continuation of application No. 10/910,851, filed on Aug. 4, 2004.

(30) Foreign Application Priority Data

Feb. 19, 2004 (KR) ................................ 2004-10931

(51) Int. Cl.
*G09G 3/36* (2006.01)
*G09G 5/00* (2006.01)
*G02F 1/1343* (2006.01)

(52) U.S. Cl. .............. 345/100; 345/87; 345/98; 345/99; 345/212; 349/143

(58) Field of Classification Search .................... 345/87, 345/89, 94, 96, 98, 99, 100; 349/143
See application file for complete search history.

(56) References Cited

U.S. PATENT DOCUMENTS

| | | | | |
|---|---|---|---|---|
| 2002/0080313 | A1 | 6/2002 | Lim | |
| 2002/0109652 | A1 * | 8/2002 | Lim et al. | 345/87 |
| 2003/0090452 | A1 | 5/2003 | Uchino et al. | |
| 2003/0151584 | A1 | 8/2003 | Song et al. | |
| 2003/0197672 | A1 * | 10/2003 | Yun et al. | 345/99 |
| 2004/0017341 | A1 | 1/2004 | Maki | |
| 2004/0027323 | A1 | 2/2004 | Tanaka et al. | |

FOREIGN PATENT DOCUMENTS

| | | |
|---|---|---|
| CN | 1469176 | 1/2004 |
| JP | 10-104577 | 4/1998 |
| TW | 200401933 | 2/2004 |

* cited by examiner

*Primary Examiner* — Amare Mengistu
*Assistant Examiner* — Jennifer Zubajlo
(74) *Attorney, Agent, or Firm* — F. Chau & Associates, LLC

(57) ABSTRACT

A liquid crystal display panel includes n-number of gate lines, (m+1)-number of data lines and (m×n)-number of pixels, wherein the 'n' and 'm' are natural numbers. The gate lines are extended in a first direction. The data lines are extended in a second direction that is substantially perpendicular to the first direction. The first and last data lines are electrically connected to each other. The pixels are arranged in a matrix shape. M-number of the pixels is arranged along the first direction, and n-number of the pixels is arranged along the second direction. A pixel electrode of the pixels arranged in the second direction are electrically connected to left and right data lines alternately to enhance a display quality and reduce power consumption.

21 Claims, 9 Drawing Sheets

FIG. 1 (Prior Art)

| | | | | | | | |
|---|---|---|---|---|---|---|---|
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |

FIG. 2 (Prior Art)

| | | | | | | | |
|---|---|---|---|---|---|---|---|
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |
| − | − | − | − | − | − | − | − |
| + | + | + | + | + | + | + | + |

FIG.3 (Prior Art)

| | | | | | | | |
|---|---|---|---|---|---|---|---|
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |
| + | − | + | − | + | − | + | − |

FIG.4 (Prior Art)

| | | | | | | | |
|---|---|---|---|---|---|---|---|
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |
| − | + | − | + | − | + | − | + |

FIG.5 (Prior Art)

| | | | | | | | |
|---|---|---|---|---|---|---|---|
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |

FIG.6 (Prior Art)

| | | | | | | | |
|---|---|---|---|---|---|---|---|
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |
| − | + | − | + | − | + | − | + |
| + | − | + | − | + | − | + | − |

LIQUID CRYSTAL DISPLAY PANEL AND DISPLAY APPARATUS HAVING THE SAME

CROSS-REFERENCE TO RELATED APPLICATIONS

This application is a Continuation Application of U.S. patent application Ser. No. 10/910,851, filed on Aug. 4, 2004, which claims priority under 35 U.S.C. §119 of Korean Patent Application No. 2004-10931, filed on Feb. 19, 2004, the contents of which are incorporated by reference herein in their entirety.

BACKGROUND OF THE INVENTION

1. Field of the Invention

The present invention relates to a liquid crystal display panel and a display apparatus having the liquid crystal display panel. More particularly, the present invention relates to a liquid crystal display panel capable of enhancing a display quality and reducing power consumption, and a display apparatus having the liquid crystal display panel.

2. Description of the Related Art

Generally, a liquid crystal display apparatus displays an image using liquid crystal. The liquid crystal display apparatus has many merits such as thin thickness, lightweight, low driving voltage, low power consumption, etc. Therefore, the liquid crystal display apparatus is widely used in various fields.

The liquid crystal display apparatus displays the image by adjusting an optical transmittance of the liquid crystal. The liquid crystal display apparatus includes a liquid crystal display panel and a driver circuit. The liquid crystal display panel includes a plurality of pixels arranged in a matrix shape, and the driver circuit drives the liquid crystal display panel.

The liquid crystal display panel includes an upper substrate, a lower substrate and a liquid crystal interposed between the upper and lower substrates. The liquid crystal display panel includes m-number of data lines and n-number of gate lines. The n-number of gate lines are substantially perpendicular to the data lines to define m×n number of pixels. Each pixel includes a thin film transistor operating as a switch. The thin film transistor includes a gate electrode that is electrically connected to one of the gate lines, a source electrode that is electrically connected to one of the data lines, and a drain electrode that is electrically connected to a pixel electrode. When the thin film transistor is turned on in response to a scan pulse applied to the gate electrode from the gate line, a pixel voltage applied to the data line is transferred to the pixel electrode through the thin film transistor.

The driver circuit includes a timing control section, a gate driving section and a data driving section. The gate driving section generates a scan pulse and applies the scan pulse to the gate lines in sequence under a control of the timing control section. The data driving section converts an image signal to the pixel voltage and applies the pixel voltage to the data lines under a control of the timing control section.

In order to reduce thermal stress and enhance a display quality, an inversion method may be employed as a driving method of the liquid crystal display apparatus. In the inversion method, the pixel voltage is inversed in accordance with time and position.

The inversion method may be classified into a frame inversion method, a line inversion method, a column inversion method and a dot inversion method in accordance with an inversion type of the pixel voltage.

In the frame inversion method, a pixel voltage corresponding to a positive voltage is applied during an odd numbered frames, and a pixel voltage corresponding to a negative voltage is applied during an even numbered frames. In this frame inversion method, flicking phenomenon occurs excessively because a pixel voltage of the pixel fluctuates over the frames.

FIGS. 1 and 2 are conceptual views illustrating a line inversion method.

In the line inversion method, a polarity of one line of pixels is opposite to a polarity of neighboring line of pixels, and the polarity of one line of pixels is changed to be opposite at a next frame as shown in FIGS. 1 and 2. In the line inversion method, a cross talk occurs between pixels disposed in a horizontal direction, so that a horizontal line pattern flicking happens.

FIGS. 3 and 4 are conceptual views illustrating a column inversion method.

In the column inversion method, a polarity of one column of pixels is opposite to a polarity of neighboring column of pixels, and the polarity of one column of pixels is changed to be opposite at a next frame as shown in FIGS. 3 and 4. In the column inversion method, a cross talk occurs between pixels disposed in a vertical direction, so that a vertical column pattern flicking happens.

FIGS. 5 and 6 are conceptual views illustrating a dot inversion method.

In the dot inversion method, a polarity of pixels is opposite to a polarity of horizontally and vertically neighboring pixels, and the polarity of pixel is changed to be opposite at a next frame as shown in FIGS. 5 and 6. That is, the polarity of pixel alternates in vertical and horizontal directions. In the dot inversion method, flicking between adjacent pixels are set off. Therefore, enhanced display quality may be obtained.

However, in the dot inversion method, the polarity of the pixel voltage alternates along the vertical and horizontal directions, so that an amount of change of the pixel voltage, and power consumption increases.

SUMMARY OF THE INVENTION

The present invention provides a liquid crystal display panel capable of enhancing a display quality and reducing power consumption.

The present invention also provides a display apparatus having the liquid crystal display panel.

In an exemplary liquid crystal display panel according to the present invention, the liquid crystal display panel includes n-number of gate lines, (m+1)-number of data lines and (m×n)-number of pixels, wherein the 'n' and 'm' are natural numbers. The gate lines are extended in a first direction. The data lines are extended in a second direction that is substantially perpendicular to the first direction. The first and last data lines are electrically connected each other. The pixels are arranged in a matrix shape. M-number of the pixels is arranged along the first direction, and n-number of the pixels is arranged along the second direction.

In an exemplary liquid crystal display apparatus according to the present invention, the liquid crystal display apparatus includes a timing control section, a gate driving section, a data driving section and a liquid crystal display panel. The timing control section outputs a gate control signal, a data control signal and image data. The gate driving section outputs a scan signal according to the gate control signal. The data driving section converts the image data into a pixel voltage to output the pixel voltage according to the data control signal. The liquid crystal display panel includes n-number of gate lines, (m+1)-number of data lines and (m×n)-number of pixels, wherein the 'n' and 'm' are natural numbers. The gate lines are extended in a first direction. The data lines are extended in a second direction that is substantially perpendicular to the first direction. The first and last data lines are electrically connected to each other. The pixels are arranged in a matrix shape. M-number of the pixels is arranged along the first direction, and n-number of the pixels is arranged along the second direction.

In another exemplary liquid crystal display apparatus according to the present invention, the liquid crystal display apparatus includes a liquid crystal display panel, a gate driving section and a data driving section. The liquid crystal display panel includes n-number of gate lines extended in a first direction, (m+1)-number of data lines extended in a second direction that is substantially perpendicular to the first direction and an (m×n)-number of switching devices formed in a region defined by the gate and data lines to be arranged in a matrix shape. The switching devices arranged along a vertical direction are electrically connected to left and right data lines alternately. A first data line and an (m+1)-the data line are electrically connected to a reference voltage. The gate driving section provides the gate lines with a scan signal. The data driving section provides the data lines with a pixel voltage.

According to the present liquid crystal display panel and display apparatus having the liquid crystal display panel, switching devices alternately disposed at left and right sides with respect to a data line are electrically connected to the data line. Additionally a data driving section applies pixel voltages to the data lines in a column inversion method, and pixel voltage is shifted right or left in accordance with time period. Therefore, the liquid crystal display panel and display apparatus may be operated by a dot inversion method, thereby reducing power consumption.

Furthermore, first and last data lines are electrically connected to each other, so that the first data line or the last data line is not in a floating state but normal pixel voltage is applied to the first data line or the last data line. Therefore, a deterioration of display quality is prevented.

BRIEF DESCRIPTION OF THE DRAWINGS

The above and other features and advantages of the present invention will become more apparent by describing in detailed exemplary embodiments thereof with reference to the accompanying drawings, in which:

FIGS. 1 and 2 are conceptual views illustrating a line inversion method;

FIGS. 3 and 4 are conceptual views illustrating a column inversion method;

FIGS. 5 and 6 are conceptual views illustrating a dot inversion method;

DESCRIPTION OF EMBODIMENTS

Hereinafter, the embodiments of the present invention will be described in detail with reference to the accompanied drawings.

Figure 7:
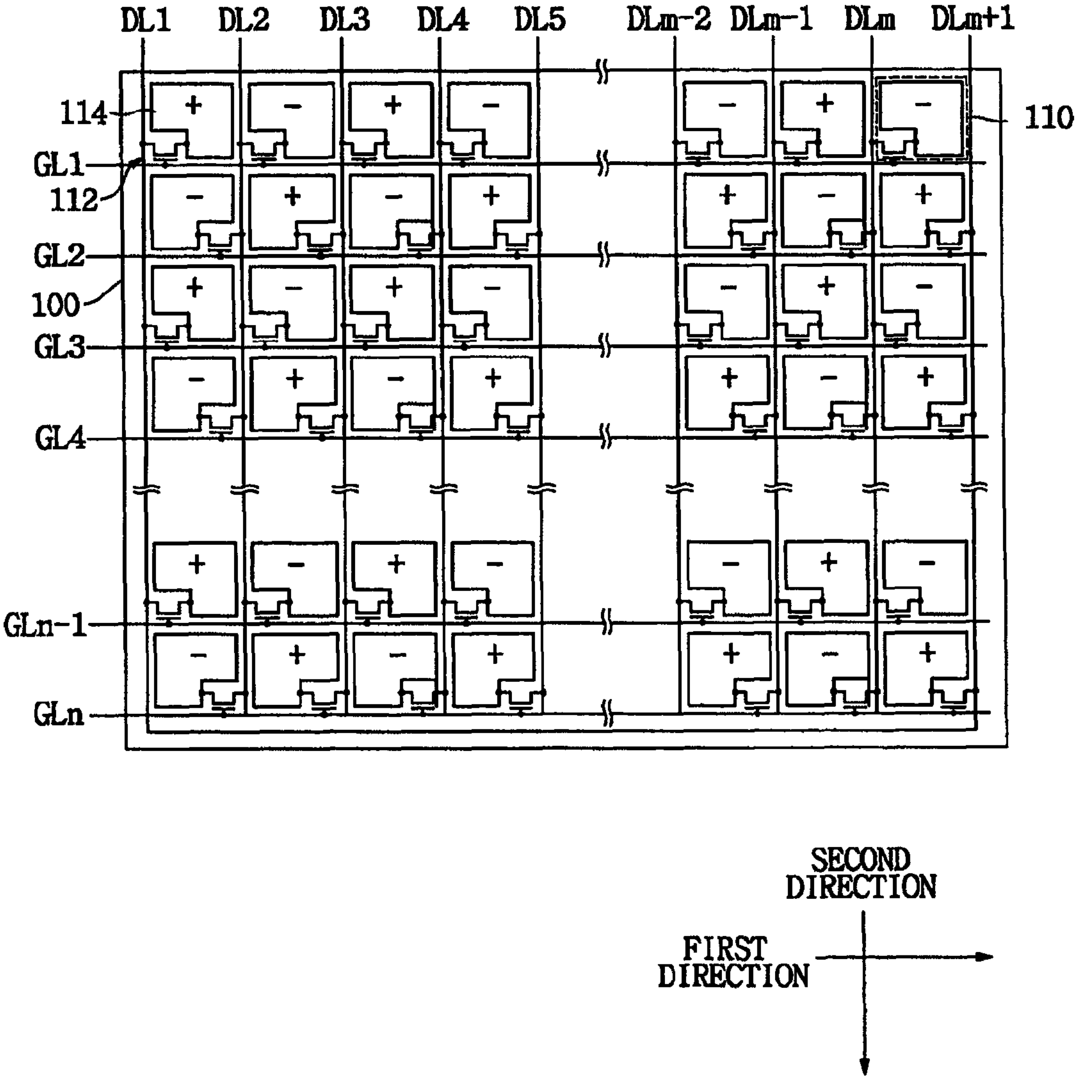
FIG. 7 is a schematic view of illustrating a liquid crystal display panel according to an exemplary embodiment of the present invention.

FIG. 7 is a schematic view of illustrating a liquid crystal display panel according to an exemplary embodiment of the present invention.

Referring to FIG. 7, a liquid crystal display panel 100 according to an exemplary embodiment of the present invention includes n-number of gate lines GL1, GL2, . . . GLn, (m+1)-number of data lines DL1, DL2, . . . DLm+1, and (m×n)-number of pixels, wherein 'n' and 'm' represent specific natural numbers, respectively.

Each of the gate lines GL1, GL2, . . . GLn is extended in a first direction corresponding to a horizontal direction, and the gate lines GL1, GL2, . . . GLn are spaced apart from each other. Each of the data line DL1, DL2, . . . DLm+1 is extended in a second direction corresponding to a vertical direction, and the data lines DL1, DL2, . . . DLm+1 are spaced apart from each other. A pixel 110 is formed in a pixel region defined by each of the gate lines GL1, GL2, . . . GLn and each of the data lines DL1, DL2, . . . DLm+1. Therefore, the (m×n)-number of pixels is arranged in a matrix shape.

Each of the pixels 110 includes a switching device 112 and a pixel electrode 114. For example, the switching device 112 corresponds to a thin film transistor TFT. The thin film transistor TFT is adjacent to the crossing region of one of the gate lines GL1, GL2, . . . GLn and one of the data lines DL1, DL2, . . . DLm+1.

The thin film transistor TFT includes a gate electrode that is electrically connected to one of the gate lines GL1, GL2, . . . GLn, a source electrode (or drain electrode) that is electrically connected to one of the data lines DL1, DL2, . . . DLm+1, and a drain electrode (or source electrode) that is electrically connected to the pixel electrode 114. Therefore, the switching device 112 is turned on in response to a scan pulse provided from the gate lines GL1, GL2, . . . GLn to provide the pixel electrode 114 with a pixel voltage provided from the data lines DL1, DL2, . . . DLm+1.

For example, the gate electrodes of the switching devices arranged along the first direction that corresponds to a horizontal direction are electrically connected to the same gate line that is one of the gate lines GL1, GL2, . . . GLn. The source electrodes of the switching devices arranged along the second direction that corresponds to a vertical direction are electrically connected alternatively to two data lines adjacent to each other.

In detail, the switching devices 112 of odd numbered horizontal lines, which are electrically connected to odd numbered gate lines GL1, GL3, GL5, . . . , are electrically connected to data lines DL1, DL2, . . . DLm that are disposed at a left side of the switching devices 112. On the contrary, the switching devices 112 of even numbered horizontal lines, which are electrically connected to even numbered gate lines GL2, GL4, GL6, . . . , are electrically connected to data lines DL2, DL4, . . . DLm+1 that are disposed at a right side of the switching devices 112. In other words, the data lines DL1, DL2, . . . DLm+1 are electrically connected to right and left switching devices 112 alternately. Therefore, the pixel electrodes 114 of odd numbered horizontal lines receive a positive or negative pixel voltage from the data lines DL1 to DLm disposed at the left side of the pixel electrodes 114, and the pixel electrodes 114 of even numbered horizontal lines receive a negative or positive pixel voltage from the data lines DL2 to DLm+1 disposed at the right side of the pixel electrodes 114.

According to the present embodiment, the switching devices 112 of the odd numbered horizontal lines are electrically connected to the data lines DL1 to DLm that are disposed at left sides of the switching devices 112, respectively, and the switching devices 112 of the even numbered horizontal lines are electrically connected to the data lines DL2 to DLm+1 that are disposed at right side of the switching devices 112, respectively. However, the switching devices 112 of the even numbered horizontal lines may be electrically connected to the data lines DL1 to DLm that are disposed at the left sides of the switching devices 112, respectively, and the switching devices 112 of the odd numbered horizontal lines may be electrically connected to the data lines DL2 to DLm+1 that are disposed at the right side of the switching devices 112, respectively.

The liquid crystal display panel 100 in accordance with the present embodiment is driven by the column inversion method. That is, a pixel voltage that is applied to the odd numbered data lines DL1, DL3, DL5, . . . is opposite to a pixel voltage that is applied to the even numbered data lines DL2, DL4, DL6, . . . However, the switching devices 112 disposed in a vertical direction are electrically connected to right and left data lines. Therefore, the liquid crystal display panel 100 operates as a dot inversion type.

An external device provides the liquid crystal display panel with m-number of pixel voltages that correspond to the number of pixels along a horizontal direction. In this case, the m-number of pixel voltages applies to the data lines DL1, DL2, . . . DLm, or DL2, DL3, . . . DLm+1. Therefore, the first data line DL1 or the last data line DLm+1 corresponds to a dummy data line to which no pixel voltage is applied. The dummy data line is in a floating state to which no signal is applied. Therefore, the dummy data line has a bad effect upon neighboring pixels to deteriorate a display quality. That is, a parasitic capacitance may be formed between the dummy data line and the neighboring pixels. Therefore, pixels that neighbor the dummy data line are unstable to deteriorate a display quality.

In order to solve this problem, the first data line DL1 and the last data line DLm+1 are electrically connected to each other, thereby removing the dummy data line. Therefore, display quality is enhanced.

Hereinafter, a liquid crystal display apparatus having the liquid crystal display panel will be explained.

Figure 8:
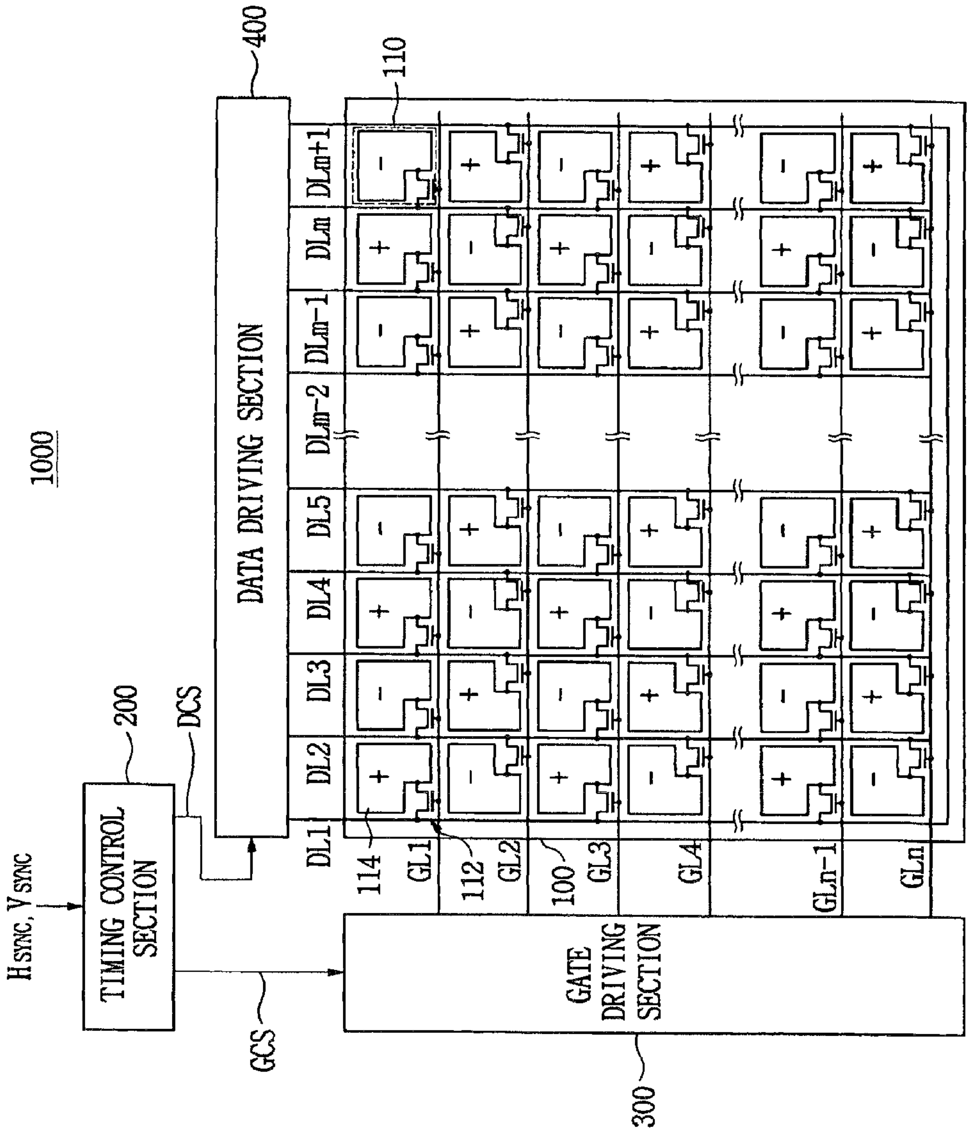
FIG. 8 is a schematic view of illustrating a liquid crystal display apparatus according to an exemplary embodiment of the present invention.

FIG. 8 is a schematic view of illustrating a liquid crystal display apparatus according to an exemplary embodiment of the present invention.

Referring to FIG. 8, a liquid crystal display apparatus 1000 according to an exemplary embodiment of the present invention includes a liquid crystal display panel 100, a timing control section 200, a gate driving section 300 and a data driving section 400. In the present embodiment, the liquid crystal display panel 100 is the same as the above embodiment. Therefore, any detailed explanation will be omitted.

The timing control section 200 provides the data driving section 400 with digital image data provided from an external graphic card (not shown). Additionally, the timing control section 200 provides the gate driving section 300 and the data driving section 400 with gate control signal GCS and data control signal DCS by the horizontal synchronous signal Hsync and the vertical synchronous signal Vsync, respectively. The gate control signal GCS includes a gate start pulse GSP, a gate shift clock GSC and a gate output enable GOE. The data control signal DCS includes a data shift clock DSC, a data start pulse DSP, a polarity control signal POL and a data output enable DOE.

The data driving section 300 provides the gate lines GL1, GL2, . . . GLn with scan pulse in sequence by using the gate control signal GCS, such as the gate start pulse GSP, the gate shift clock GSC and the gate output enable GOE, provided from the timing control section 200. The scan pulse turns on the switching devices of horizontal line in sequence along a vertical direction to select scan line to which image data are applied. The gate driving section 300 includes a shift register (not shown) that generates the scan pulse in sequence and a level shifter (not shown) that shifts a swing width of the scan pulse and voltage.

The data driving section 400 provides the data lines DL1, DL2, . . . DLm+1 with the image data by using the data control signal DCS, such as the data shift clock DSC, the data start pulse DSP, the polarity control signal POL and the data output enable DOE, provided from the timing control section 200. The data driving section 400 converts the m-number of image data into the m-number of pixel voltages that are analog type, and the data driving section 400 provides the data line DL1, DL2, . . . DLm+1 with the m-number of pixel voltages in response to the scan pulse. The data driving section 400 converts digital image data into the pixel voltage of analog type by using a positive or negative gamma voltage provided from an external gamma voltage generating section (not shown). In the present embodiment, the first data line DL1 and the last data line DLm+1 are electrically connected to each other, so that same pixel voltage is applied to both the first and last data lines DL1 and DLm+1.

According to the present embodiment, the data driving section 400 provides the data lines DL1, DL2, . . . DLm+1 with the pixel voltages using the column inversion method. That is, the data driving section 400 provides the odd numbered data line DL1, DL3, DL5, . . . with a positive (or negative) pixel voltage, and the data driving section 400 provides the even numbered data line DL2, DL4, DL6 . . . with a negative (or positive) pixel voltage. Additionally, the data driving section 400 provides the data lines DL1, DL2, . . . DLm+1 with the pixel voltage directly or after shifting by one line. Therefore, the liquid crystal display panel 100 operates as the dot inversion type.

For example, the m-number of pixel voltages that is inversed as a column inversion type is applied to the data lines DL1, DL2, . . . DLm+1. The pixel voltages of odd numbered horizontal lines are applied to the first to m-th data lines DL1 to DLm directly. However, the pixel voltages of even numbered horizontal lines are shifted in a right direction to be applied to the second to (m+1)-th data lines DL2 to DLm+1.

In detail, the pixel voltages applied to pixels will be explained.

Figure 9:
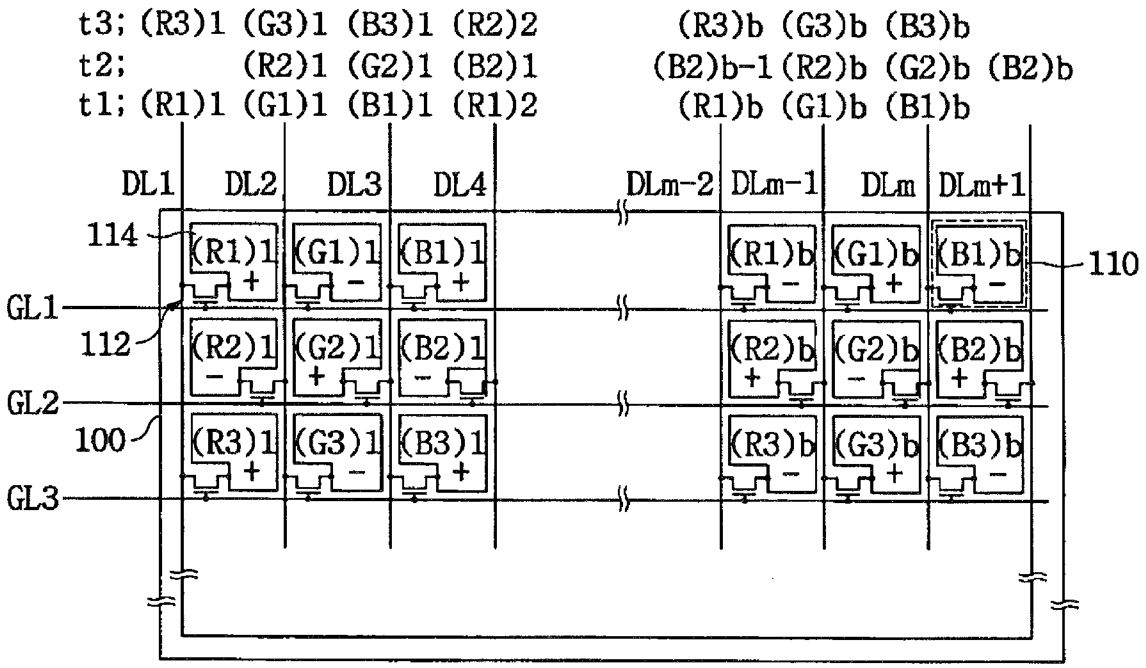
FIG. 9 is a schematic view illustrating a driving sequence of the liquid crystal display apparatus in FIG. 8.

FIG. 9 is a schematic view illustrating a driving sequence of the liquid crystal display apparatus in FIG. 8.

Referring to FIGS. 8 and 9, m-number of pixel voltages outputted from the data driving section 400 includes red color "R" pixel voltages, green color "G" pixel voltages and blue color "B" pixel voltages, and the red color pixel voltages, the green color pixel voltages and the blue color pixel voltages are arranged in sequence. The data driving section 400 provides the odd numbered pixels 110 with a positive pixel voltages through the odd numbered data lines DL1, DL3, DL5, . . . and even numbered pixels 110 with a negative pixel voltages through even numbered data lines DL2, DL4, DL6, . . . during a first period t1 when the scan pulse is applied to the first gate line GL1. Then, the data driving section 400 shifts the pixel voltages in a right direction by one line to provide the odd numbered pixels 110 with a negative pixel voltages through the even numbered data lines DL2, DL4, DL6, . . . and even numbered pixels 110 with a positive pixel voltages through odd numbered data lines DL1, DL3, DL5, . . . during a second period t2 when the scan pulse is applied to the second gate line GL2.

In detail, during the first period t1 when the scan pulse is applied to the first gate line GL1, the data driving section 400 provides the first to m-th data lines DL1 to DLm with m-number of pixel voltages (R1)1, (G1)1, (B1)1, . . . (R1)b, (G1)b, (B1)b, respectively, wherein 'b' is m/3. The first data line DL1 is electrically connected to the last data line DLm+1, so that the same pixel voltage is applied to both the first and last data lines DL1 and DLm+1.

During the second period t2 when the scan pulse is applied to the second gate line GL2, the data driving section 400 shifts m-number of pixel voltages (R2)1, (G2)1, (B2)1, . . . (R2)b, (G2)b, (B2)b in the right direction by one line to provide the second to (m+1)-th data lines DL2 to DLm+1 with the m-number of pixel voltages (R2)1, (G2)1, (B2)1, . . . (R2)b, (G2)b, (B2)b, respectively. The last data line DLm+1 is electrically connected to the first data line DL1, so that the same pixel voltage is applied to both the first and last data lines DL1 and DLm+1.

During the third period t3 when the scan pulse is applied to the third gate line GL3, the data driving section 400 provides the first to m-th data lines DL1 to DLm with m-number of pixel voltages (R3)1, (G3)1, (B3)1, . . . (R3)b, (G3)b, (B3)b, respectively. The first data line DL1 is electrically connected to the last data line DLm+1, so that the same pixel voltage is applied to both the first and last data lines DL1 and DLm+1.

As explained above, the data driving section provides the data lines with the pixel voltages as the column inversion type, and the switching device is electrically connected to the data lines alternately. Therefore, the liquid crystal display panel 100 operates as the dot inversion type. Furthermore, the firs data line DL1 and the last data line DLm+1 are electrically connected to each other in order to prevent the first and last data lines DL1 and DLm+1 from being in a floating state. Therefore, the deterioration of display quality is prevented.

However, when the first data line DL1 and the last data line DLm+1 are electrically connected to each other on the liquid crystal display panel, a length of the first and last data line DL1 and DLm+1 may be longer than a length of other data lines DL2 to DLm to induce RC delay. Therefore, a signal distortion may be induced.

Figure 10:
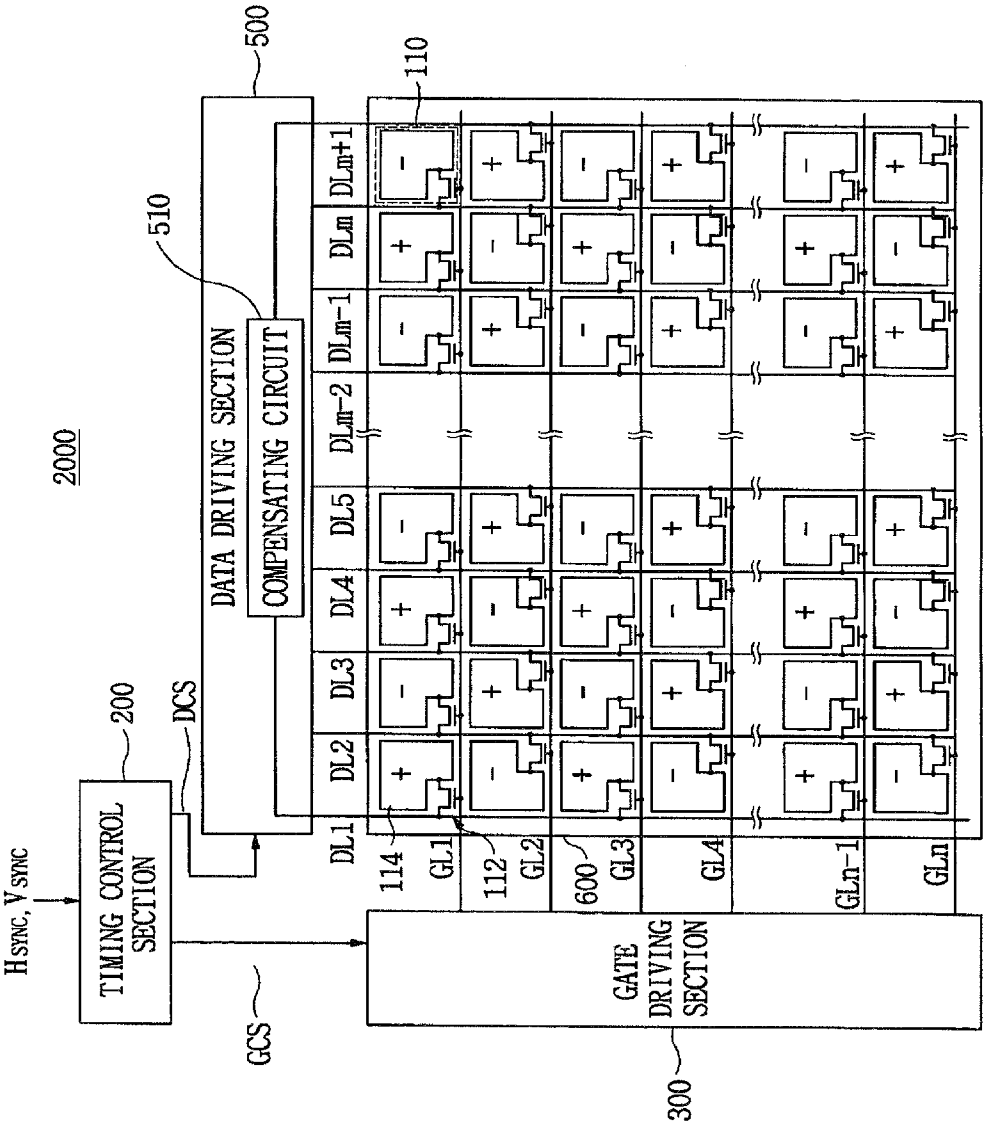
FIG. 10 is a schematic view of illustrating a liquid crystal display apparatus according to another exemplary embodiment of the present invention.

FIG. 10 is a schematic view of illustrating a liquid crystal display apparatus according to another exemplary embodiment of the present invention.

Referring to FIG. 10, the liquid crystal display apparatus 2000 according to another exemplary embodiment of the present invention includes a liquid crystal display panel 600, a timing control section 200, a gate driving section 300 and a data driving section 500. The timing control section 200 and the gate driving section 300 are substantially the same as in the above embodiment. Therefore, same reference numbers is used for the timing control section 200 and the gate driving section 300 and any further explanation will be omitted.

A first data line DL1 and a last data line DLm+1 of the liquid crystal display panel 600 are electrically connected to each other not on the liquid crystal display panel 600 but via the data driving section 500. That is, the data driving section 500 includes a conducting line for electrically connecting the first and last data lines DL1 and DLm+1.

However, even when the first and last data lines DL1 and DLm+1 are electrically connected to each other in the data driving section 500, the signal distortion may occur due to RC delay.

Therefore, the data driving section 500 according to the present invention further includes a compensating circuit 510 for minimizing the signal distortion. For example, the compensation circuit 510 may include an operational amplifier (OP-AMP) for compensating the RC-delay.

Figure 11:
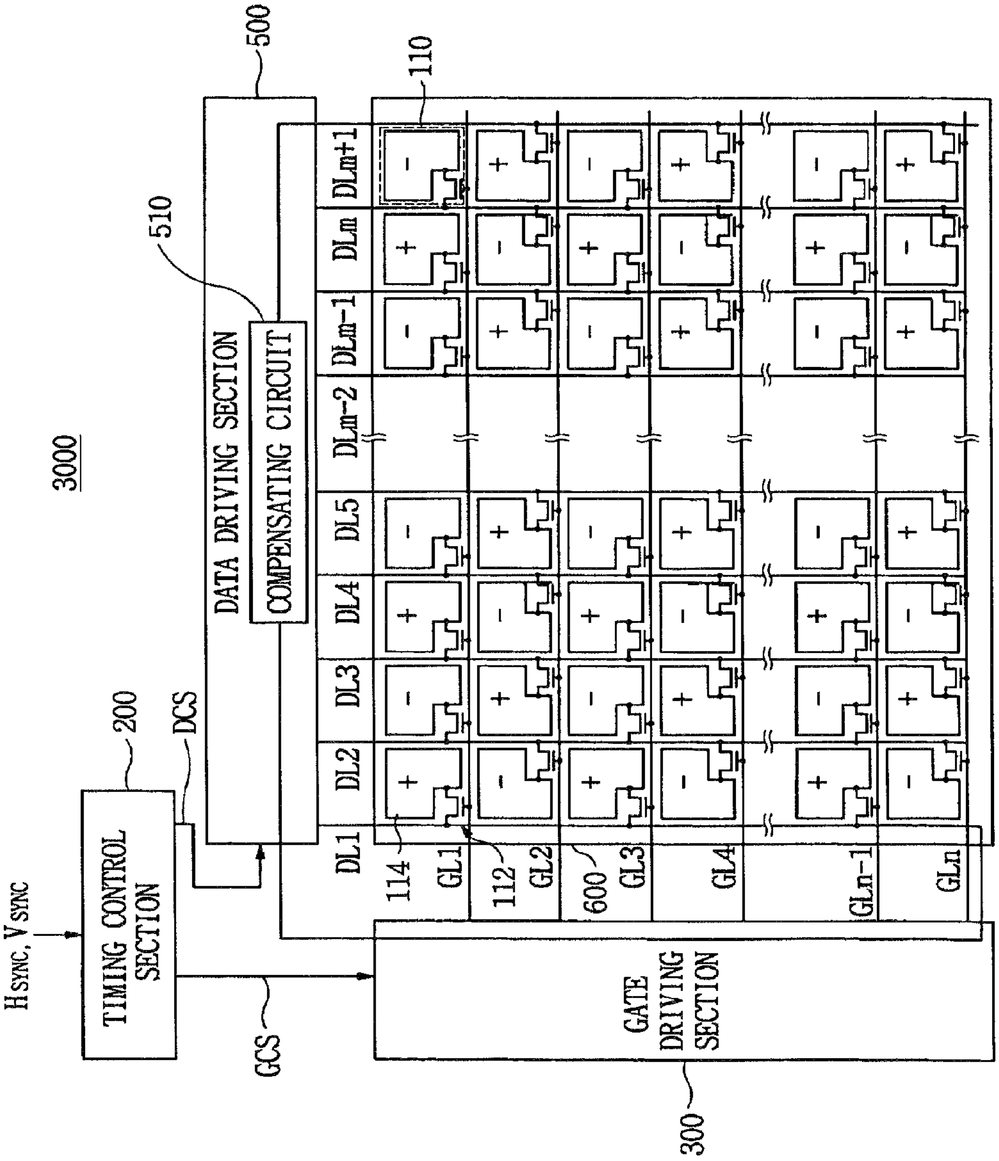
FIG. 11 is a schematic view of illustrating a liquid crystal display apparatus according to still another exemplary embodiment of the present invention.

FIG. 11 is a schematic view of illustrating a liquid crystal display apparatus according to still another exemplary embodiment of the present invention.

Referring to FIG. 11, a first data line DL1 and a last data line DLm+1 are electrically connected to each other through a data driving section 500 and a gate driving section 300. In detail, the data driving section 500 and the gate driving section 300 further include a conducting line for electrically connecting the first and last data lines DL1 and DLm+1. The first data line DL1 is extended externally to be electrically connected to the conducting line of the gate driving section 300, and the last data line DLm+1 is electrically connected to the conducing line of the data driving section 500. The conducting line of the gate driving section 300 and the conducting line of the data driving section 500 are extended externally to be electrically connected to each other.

A flexible printed circuit board (not shown) may be employed in order to electrically connect the gate driving section 300 to the data driving section 500.

A compensating circuit 510 formed at the data driving section 500 compensates the RC delay caused by electric connection between the first and last data lines DL1 and DLm+1. The compensating circuit 510 may be formed in at the gate driving section 300.

As described above, the first and second data lines DL1 and DLm+1 may be electrically connected in various ways to prevent a deterioration of display quality, which is caused by dummy data line. Hereinafter, other embodiment for preventing the deterioration of display quality will be explained.

Figure 12:
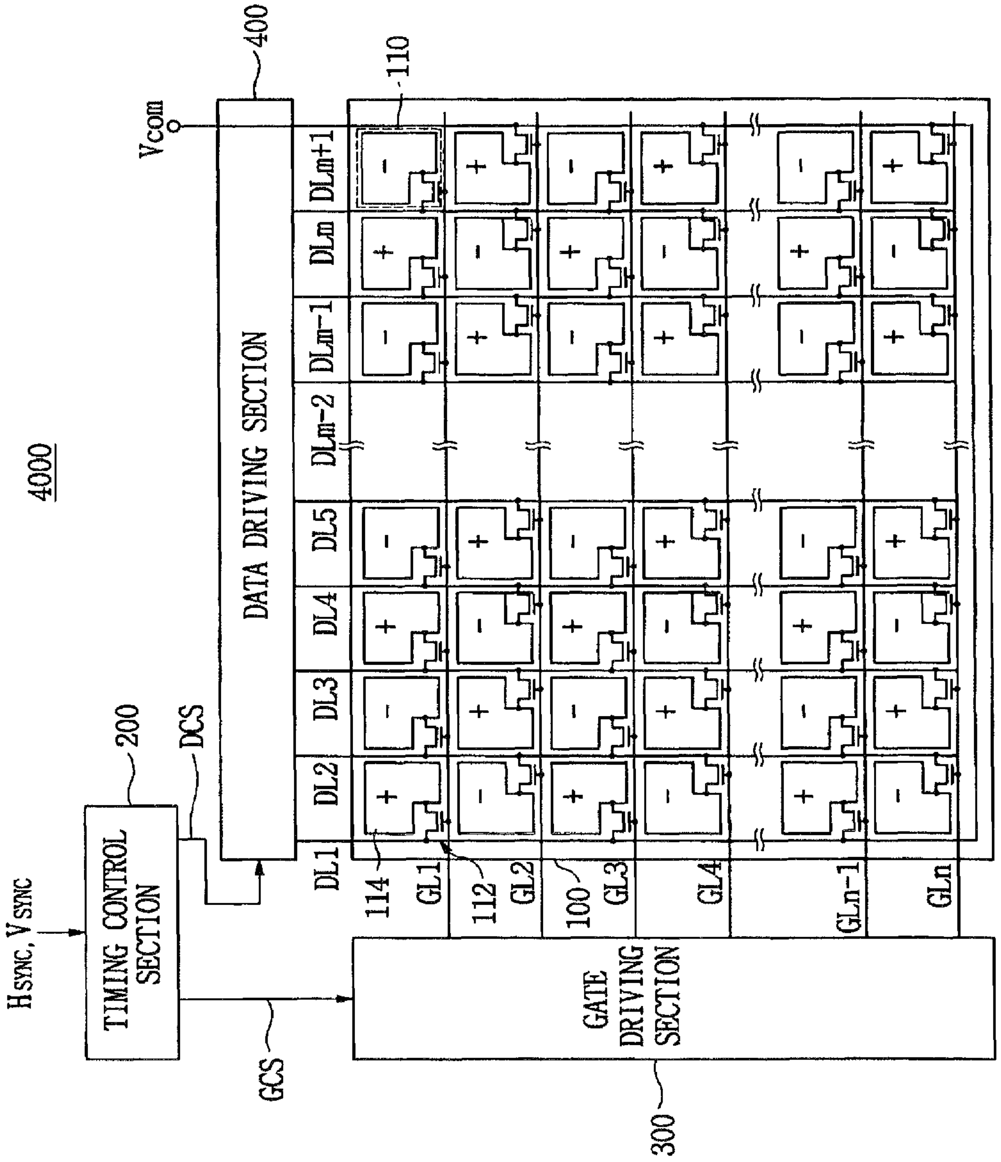
FIG. 12 is a schematic view of illustrating a liquid crystal display apparatus according to still another exemplary embodiment of the present invention.

FIG. 12 is a schematic view of illustrating a liquid crystal display apparatus according to still another exemplary embodiment of the present invention. The liquid crystal display apparatus of the present embodiment is the same as in FIG. 8 except for a liquid crystal display panel. Thus, the same reference numerals will be used to refer to the same or similar parts as those described in FIG. 8 and any further explanation will be omitted.

Referring to FIG. 12, a liquid crystal display apparatus 4000 according to the present embodiment includes a liquid crystal display panel 700, a timing control section 200, a gate driving section 300 and a data driving section 400.

In the present embodiment, a first data line DL1 and a last data line DLm+1 are not electrically connected to each other. Therefore, the first data line DL1 or the last data line DLm+1 corresponds to a dummy data line to which no image data signals are applied on a specific time period. Therefore, abnormal pixel voltages are applied to pixels 110 neighboring the first and last data lines DL1 and DLm+1.

In order to prevent abnormal pixel voltages applied to the pixels 110, the first data line DL1 or the last data line DLm+1 is electrically connected to a reference voltage Vcom having a constant magnitude. Therefore, the reference voltage Vcom is continuously applied to pixels 110 that are electrically connected to the dummy data line. As a result, in a normally white mode, the pixels 110 that are electrically connected to the dummy data line display white color continuously, and in a normally black mode, the pixels 110 that are electrically connected to the dummy data line display black color continuously.

The first data line DL1 and the last data line DLm+1 may be electrically connected to a second data line DL2 and a second last data line DLm that are adjacent to the first data line DL1 and the last data line DLm+1, respectively.

The first data line DL1 and the last data line DLm+1 may be electrically connected to a third data line DL3 and a third last data line DLm−1, respectively.

When the first data line DL1 and the last data line DLm+1 are electrically connected to a second data line DL2 and a second last data line DLm, respectively, the pixels of the first data line DL1 and the pixels of the second data line DL2 displays same images, and the pixels of the last data line DLm+1 and the pixels of the second last data line DLm displays same images. Therefore, the pixels of the first and second data lines or pixels of the last and second last data lines do not correspond to the dot inversion type.

However, when the first data line DL1 and the last data line DLm+1 are electrically connected to the third data line DL3 and the third last data line DLm−1, respectively, the pixels of the first data line DL1 and the pixels of the third data line DL3 displays same images, and the pixels of the last data line DLm+1 and the pixels of the third last data line DLm−1 displays same images. Therefore, the pixels of the first and second data lines or the pixels of the last and second last data lines correspond to the dot inversion type.

According to the present liquid crystal display panel and display apparatus having the liquid crystal display panel, the switching devices alternately disposed at the left and right sides with respect to a data line are electrically connected to the data line. Additionally, a data driving section applies pixel voltages to the data lines in a column inversion method, and pixel voltage is shifted right or left by one line in each even numbered horizontal line in accordance with time period. Therefore, the liquid crystal display panel and display apparatus may be operated by a dot inversion method, thereby reducing power consumption.

Furthermore, first and last data lines are electrically connected to each other, so that the first data line or the last data line is not in a floating state but normal pixel voltage is applied to the first data line or the last data line. Therefore, the deterioration of display quality is prevented.

Having described the exemplary embodiments of the present invention and its advantages, it is noted that various changes, substitutions and alterations can be made herein without departing from the spirit and scope of the invention as defined by appended claims.

What is claimed:

1. A liquid crystal display panel comprising:

n-number of gate lines that are extended in a first direction;

(m+1)-number of data lines that are extended in a second direction that is substantially perpendicular to the first direction, first and last data lines being electrically connected to each other via a conducting line, each of the first and last data lines electrically connected to pixel electrodes through thin-film transistors so that a same voltage is applied to the pixel electrodes electrically connected to the first and last data lines; and (m×n)-number of pixels arranged in a matrix shape, m-number of the pixels being arranged along the first direction, and n-number of the pixels being arranged along the second direction, wherein ‘n’ and ‘m’ are natural numbers.

2. The liquid crystal display panel of claim 1, further comprising (m×n)-number of switching devices that are electrically connected to one of the gate lines and one of the data lines.

3. The liquid crystal display panel of claim 2, wherein the switching devices that are arranged in an a-th horizontal line are electrically connected to the data lines that are disposed at a left side of the switching devices, wherein ‘a’ is an even or odd number that is no greater than ‘n’.

4. The liquid crystal display panel of claim 3, wherein the switching devices that are arranged in an (a+1)-th horizontal line are electrically connected to the data lines that are disposed at a right side of the switching devices.

5. The liquid crystal display panel of claim 2, wherein the pixels comprises pixel electrodes that are electrically connected to the switching devices.

6. The liquid crystal display panel of claim 5, wherein the switching devices are turned on by a gate signal that is applied to the switching device through the gate lines, and the switching devices apply a data signal provided from the data line to the pixel electrode.

7. The liquid crystal display panel of claim 1, wherein the first and last data lines are physically connected to each other.

8. A liquid crystal display apparatus comprising:

a timing control section that outputs a gate control signal, a data control signal and image data;

a gate driving section that outputs a scan signal according to the gate control signal;

a data driving section that converts the image data into a pixel voltage to output the pixel voltage according to the data control signal; and a liquid crystal display panel that includes:

n-number of gate lines that are extended in a first direction;

(m+1)-number of data lines that are extended in a second direction that is substantially perpendicular to the first direction, first and last data lines being electrically connected to each other via a connection line, each of the first and last data lines electrically connected to pixel electrodes through thin-film transistors so that a same voltage is applied to the pixel electrodes electrically connected to the first and last data lines; and (m×n)-number of pixels arranged in a matrix shape, m-number of the pixels being arranged along the first direction, and n-number of the pixels being arranged along the second direction, wherein ‘n’ and ‘m’ are natural numbers.

9. The liquid crystal display apparatus of claim 8, wherein the pixels further comprise (m×n)-number of switching devices that are electrically connected to one of the gate lines and one of the data lines.

10. The liquid crystal display apparatus of claim 9, wherein the switching devices that are arranged in an a-th horizontal line are electrically connected to the data lines that are disposed at a left side of the switching devices, wherein ‘a’ is an even or odd number that is no greater than ‘n’.

11. The liquid crystal display apparatus of claim 10, wherein the switching devices that are arranged in an (a+1)-th horizontal line are electrically connected to the data lines that are disposed at a right side of the switching devices.

12. The liquid crystal display apparatus of claim 11, wherein the timing control section provides image data to the data driving section in an inputted order, when the timing control section outputs the image data corresponding to pixels of the a-th horizontal line.

13. The liquid crystal display apparatus of claim 12, wherein the timing control section shifts image data by one line to the data driving section and provides the image data to the data driving section, when the timing control section outputs the image data corresponding to pixels of the (a+1)-th horizontal line.

14. The liquid crystal display apparatus of claim 8, wherein a first data line and an (m+1)-th data line are electrically connected to each other on the liquid crystal display panel.

15. The liquid crystal display apparatus of claim 8, a first data line and an (m+1)-th data line are electrically connected to each other through the data driving section.

16. The liquid crystal display apparatus of claim 15, wherein the data driving section further comprises a compensating circuit that compensates a signal distortion, and the compensating circuit is disposed along the connection line of the first and (m+1)-th data lines.

17. The liquid crystal display apparatus of claim 8, wherein a first data line and an (m+1)-th data line are electrically connected to each other through the data driving section and gate driving section.

18. The liquid crystal display apparatus of claim 8, wherein a same pixel voltage is applied to both a first data line and an (m+1)-th data line.

19. The liquid crystal display apparatus of claim 8, wherein the first and last data lines are physically connected to each other.

20. A liquid crystal display panel comprising:

n-number of gate lines that are extended in a first direction;

(m+1)-number of data lines that are extended in a second direction that is substantially perpendicular to the first direction; and (m×n)-number of pixels arranged in a matrix shape, m-number of the pixels being arranged along the first direction, and n-number of the pixels being arranged along the second direction, wherein 'n' and 'm' are natural numbers, wherein a first data line is electrically connected to a second data line via a connection line such that a same voltage is applied to pixel electrodes electrically connected to the first data line, and pixel electrodes electrically connected to the second data line, the pixel electrodes being connected to the first and second data lines through thin-film transistors, or an (m+1)-th data line is electrically connected to an m-th data line via a connection line such that a same voltage is applied to pixel electrodes electrically connected to the (m+1)-th data line, and pixel electrodes electrically connected to the m-th data line, the pixel electrodes being connected to the (m+1)-th and m-th data lines through thin-film transistors.

21. A liquid crystal display panel comprising:

n-number of gate lines that are extended in a first direction;

(m+1)-number of data lines that are extended in a second direction that is substantially perpendicular to the first direction; and (m×n)-number of pixels arranged in a matrix shape, m-number of the pixels being arranged along the first direction, and n-number of the pixels being arranged along the second direction, wherein 'n' and 'm' are natural numbers, wherein a first data line is electrically connected to a third data line via a connection line such that a same voltage is applied to pixel electrodes electrically connected to the first data line, and pixel electrodes electrically connected to the third data line, the pixel electrodes being connected to the first and third data lines through thin-film transistors, or an (m+1)-th data line is electrically connected to an (m−1)-th data line via a connection line such that a same voltage is applied to pixel electrodes electrically connected to the (m+1)-th data line, and pixel electrodes electrically connected to the (m−1)-th data line, the pixel electrodes being connected to the (m+1)-th and (m−1)-th data lines through thin-film transistors.

* * * * *